(12) United States Patent
Nydam

(10) Patent No.: US 8,042,863 B2
(45) Date of Patent: Oct. 25, 2011

(54) VEHICLE ROOF BOW ASSEMBLY

(75) Inventor: Scott Nydam, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 79 days.

(21) Appl. No.: 12/033,779

(22) Filed: Feb. 19, 2008

(65) Prior Publication Data
US 2009/0206636 A1    Aug. 20, 2009

(51) Int. Cl.
    *B62D 25/06*    (2006.01)
(52) U.S. Cl. .................. 296/210; 296/104; 296/203.03; 296/214
(58) Field of Classification Search ............... 296/185.1, 296/104, 210, 214, 203.03
    See application file for complete search history.

(56) References Cited

U.S. PATENT DOCUMENTS

| | | | | |
|---|---|---|---|---|
| 1,509,142 A * | 9/1924 | Haggart, Jr. | .................. | 296/178 |
| 1,629,588 A * | 5/1927 | Rotthouse | ..................... | 296/210 |
| 1,645,582 A * | 10/1927 | Bourgon | ........................ | 296/210 |
| 1,656,721 A * | 1/1928 | Breneman | ..................... | 296/210 |
| 1,656,722 A * | 1/1928 | Breneman | ..................... | 296/210 |
| 1,706,527 A * | 3/1929 | Hawkes | ........................ | 296/210 |
| 1,733,007 A * | 10/1929 | Dahl | ........................... | 135/88.07 |
| 1,768,368 A * | 6/1930 | Menzies | ....................... | 296/210 |
| 1,968,531 A * | 7/1934 | Ledwinka | ..................... | 296/210 |
| 2,072,842 A * | 3/1937 | Trautvetter | ................... | 296/210 |
| 2,185,345 A * | 1/1940 | Krogh | ........................... | 296/210 |
| 3,476,437 A * | 11/1969 | Tomala et al. | ................ | 296/218 |
| 3,700,277 A * | 10/1972 | Montean, Jr. | ................. | 296/104 |
| 4,601,511 A * | 7/1986 | Nakamura et al. | ............ | 296/210 |
| 5,558,369 A * | 9/1996 | Cornea et al. | ................ | 280/800 |
| 5,681,076 A * | 10/1997 | Yoshii | ........................... | 296/210 |
| 5,735,569 A * | 4/1998 | Takagi et al. | ................. | 296/210 |
| 5,857,736 A * | 1/1999 | Feathers | ....................... | 296/214 |
| 7,165,806 B2 | 1/2007 | Osterberg et al. | | |
| 7,416,247 B2 * | 8/2008 | Dunneback et al. | .......... | 296/219 |
| 7,770,958 B2 * | 8/2010 | Bunsmann | .................... | 296/121 |
| 2001/0033096 A1* | 10/2001 | Hanyu | ..................... | 296/203.01 |
| 2009/0121514 A1* | 5/2009 | Remmel et al. | .......... | 296/100.12 |

FOREIGN PATENT DOCUMENTS

JP    2003261063 A  *  9/2003
JP    2007186207 A  *  7/2007

* cited by examiner

*Primary Examiner* — Glenn Dayoan
*Assistant Examiner* — Pinel E Romain
(74) *Attorney, Agent, or Firm* — Global IP Counselors, LLP

(57) ABSTRACT

A vehicle roof bow assembly includes a roof bow member and a pair of telescoping mounting brackets. The roof bow member is configured to extend in a lateral side-to-side direction along an underside of a vehicle roof panel. The telescoping mounting brackets each have a first end and a second end with the first end having a side rail attachment flange configured for rigid attachment to a first vehicle roof side rail and a roof panel attachment flange configured for rigid attachment to the vehicle roof panel and the second end being attached to the roof bow member. The telescoping mounting brackets are disposed at opposite ends of the roof bow member.

16 Claims, 8 Drawing Sheets

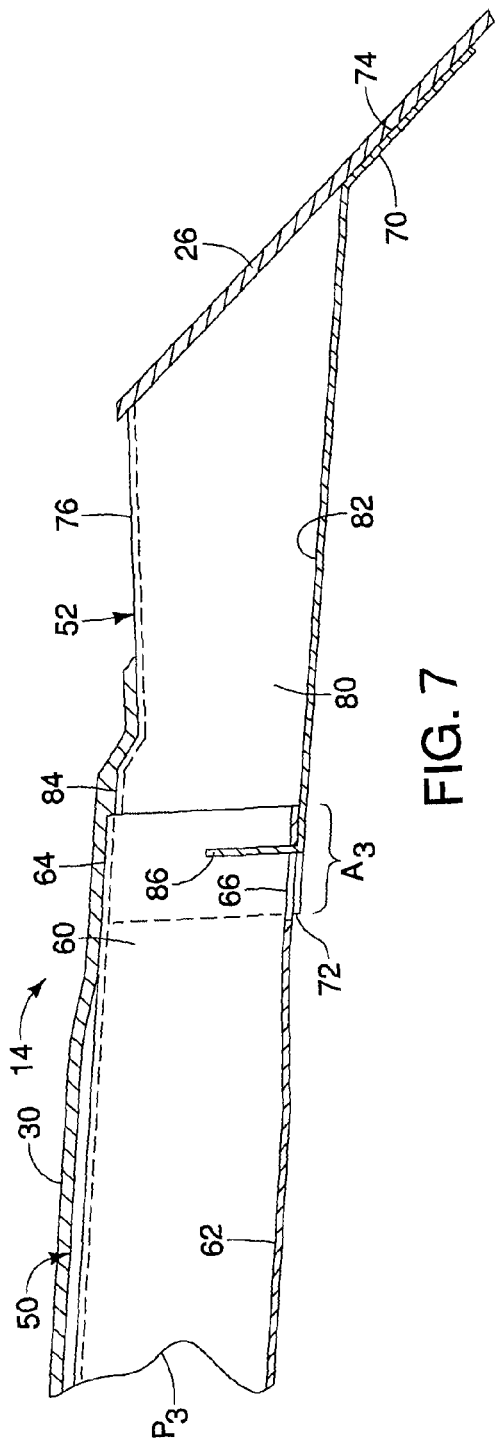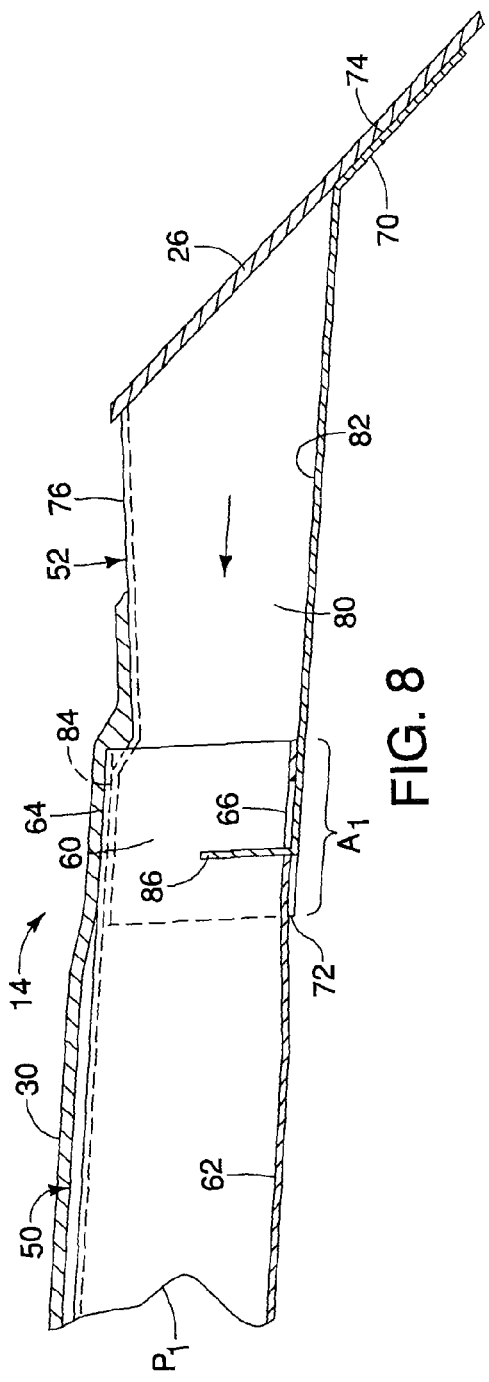

VEHICLE ROOF BOW ASSEMBLY

BACKGROUND OF THE INVENTION

1. Field of the Invention

The present invention relates to a vehicle body structure that includes a roof bow assembly. More specifically, the present invention relates to a vehicle body structure that includes a plurality of roof bow assemblies that adjust to differing lengths for use in different locations with the body structure.

2. Background Information

In both unibody and frame construction, vehicle manufacturers design and manufacture unique parts for each of the elements used in the assembly of a vehicle body structure. For example, in a utility van design where the roof panel has a curved or contoured shape, several uniquely dimensioned roof bows are required to support and secure the roof panel. More specifically, where several roof bows are required in the roof panel design, each roof bow can have a different dimension and angular orientation. The design and manufacture of these differing roof bows is costly, requires increased inventory cataloguing and increased storage space to store such additional body elements near the assembly line.

In view of the above, it will be apparent to those skilled in the art from this disclosure that there exists a need for an improved roof bow design that solves these problems. This invention addresses this need in the art as well as other needs, which will become apparent to those skilled in the art from this disclosure.

SUMMARY OF THE INVENTION

One object of the present invention is to provide a single structural element design that can be installed and utilized in a plurality of different locations within a vehicle body structure.

Another object of the present invention is to provide a single structural assembly that can be adjusted to a variety of lengths prior to installation in a vehicle body structure.

In accordance with one aspect of the present invention, a vehicle roof bow assembly includes a roof bow member and a telescoping mounting bracket. The roof bow member is configured to extend in a lateral side-to-side direction along an underside of a vehicle roof panel. The telescoping mounting bracket has a first end and a second end with the first end having a side rail attachment flange configured for rigid attachment to a first vehicle roof side rail and a roof panel attachment flange configured for rigid attachment to the vehicle roof panel and the second end being attached to the roof bow member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is a side view of the telescoping roof bow assembly showing the telescoping mounting bracket in a first telescoping position relative to the roof bow member in accordance with the present invention;

FIG. 8 is another side view of the telescoping roof bow assembly showing the telescoping mounting bracket in a second telescoping position relative to the roof bow member in accordance with the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
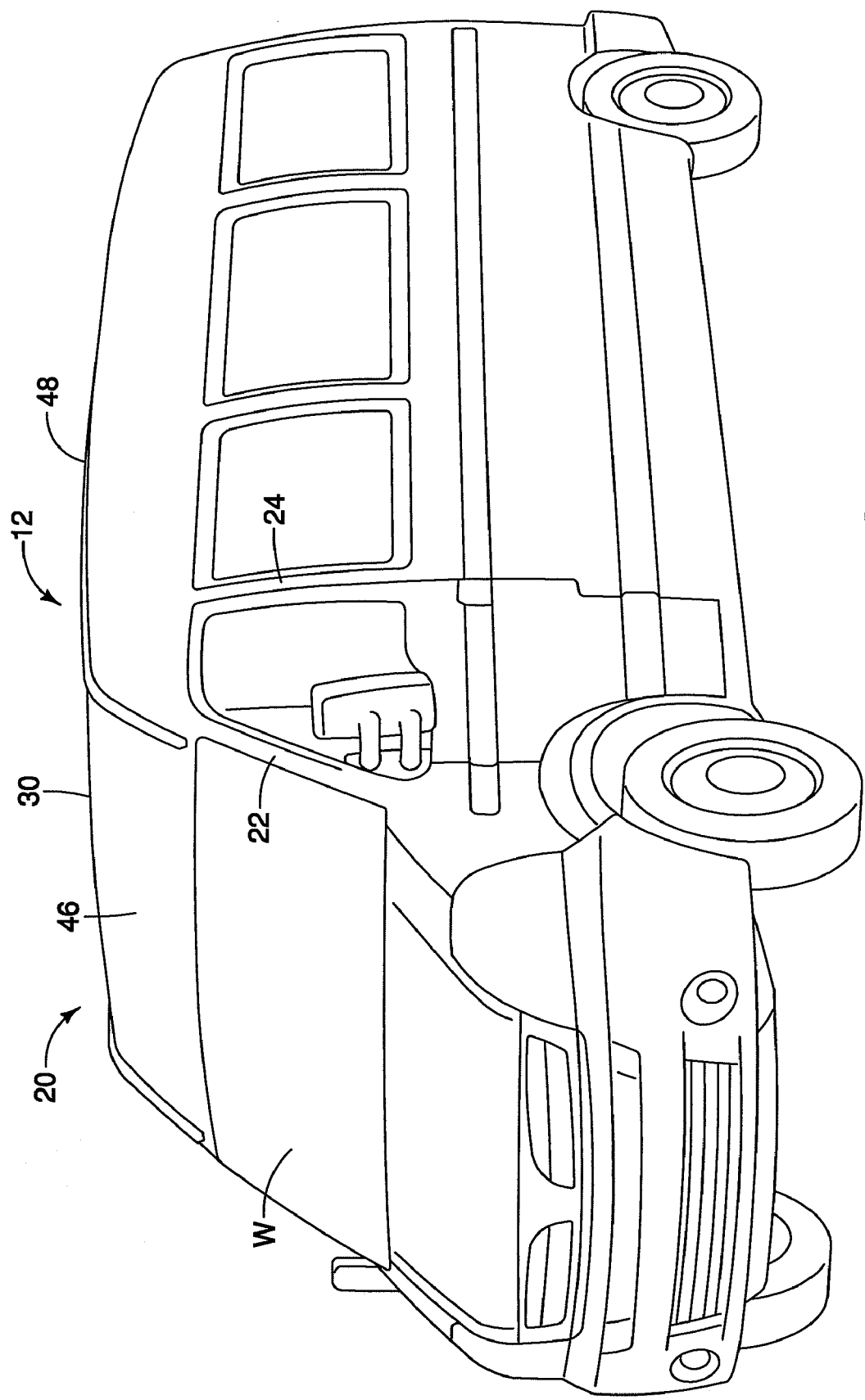
FIG. 1 is a perspective view of a vehicle that has a raised roof panel supported to a vehicle body structure by a plurality of telescoping roof bow assemblies in accordance with the present invention.
Figure 2:
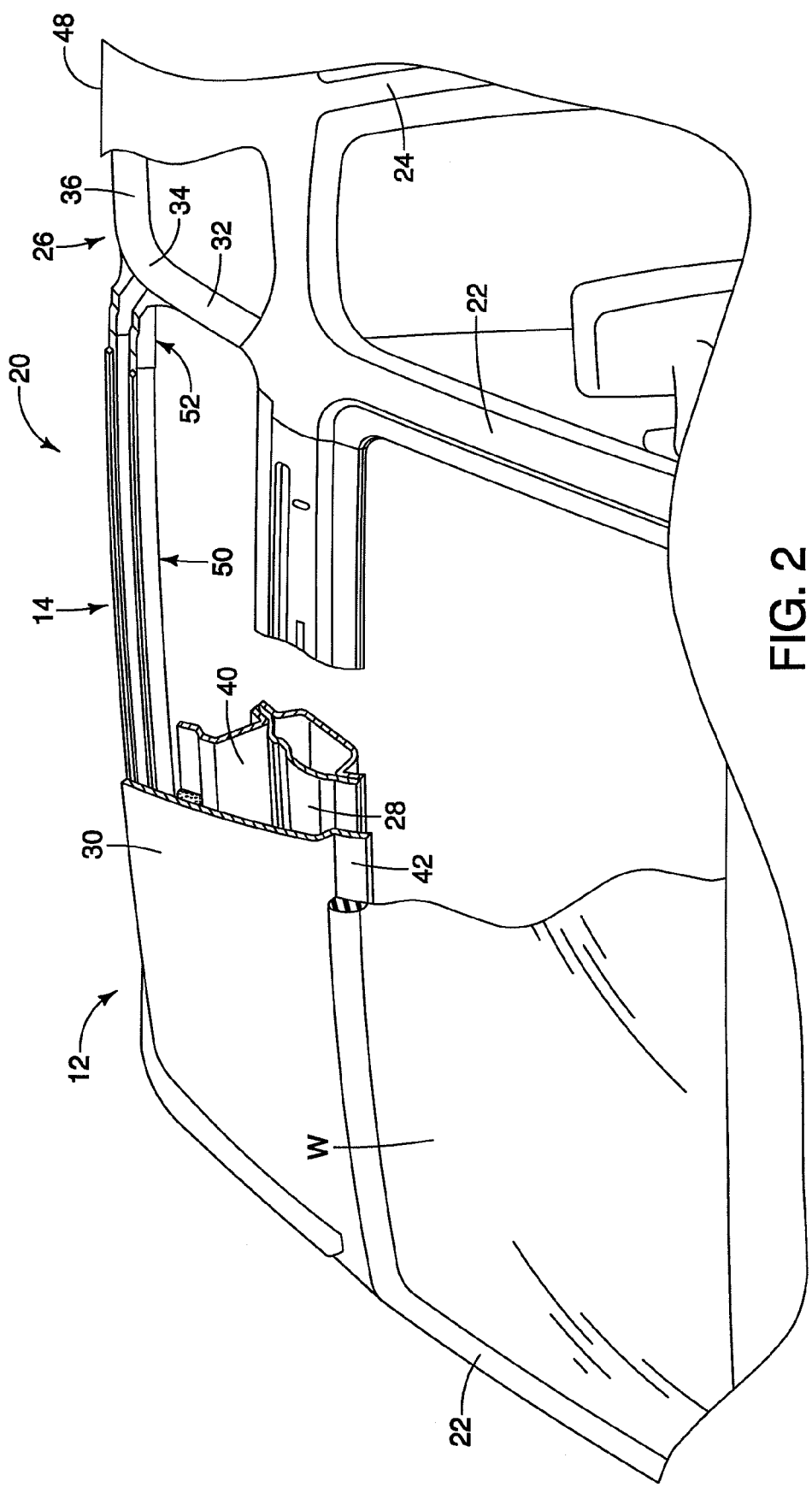
FIG. 2 is another perspective view of the vehicle showing a portion of the roof panel cutaway to reveal the first of several telescoping roof bow assemblies in accordance with the present invention.

Referring initially to FIGS. 1 and 2, vehicle 12 is illustrated in accordance with a first embodiment of the present invention. The vehicle 12 includes a plurality of roof bow assemblies 14 (only one is shown in FIG. 2). The roof bow assemblies 14 are structural portions of a vehicle body structure 20 that are all initially manufactured to the same specifications but can be adjusted to differing lengths as necessary, as described in greater detail below.

The vehicle 12 is depicted as a van or light truck. However, it should be understood from the drawings and the description herein that the vehicle 12 can be any of a variety of vehicle configurations and is not limited to a van or light truck. Further, the vehicle 12 is depicted as a vehicle configuration with a raised roof that has increased interior height compared to conventional van configurations. However, it should be understood that the roof bow assemblies 14 of the present invention can be used in any of a variety of vehicles and usage thereof is not limited to installation in a van, a truck or to a vehicle configuration with a raised roof. More specifically, the roof bow assemblies 14 can be used in any vehicle where multiple roof bow assemblies are required having differing lengths.

The vehicle 12 has the above mentioned vehicle body structure 20 that includes a variety of structural elements. However, in the description of the present invention, only a limited number of those elements are described for the sake of brevity. As shown in FIG. 2, the vehicle body structure 20 includes (among other things) A-pillars 22, B-pillars 24, side roof rails 26 (only one visible in FIG. 3), a front structural support member 28, a roof panel 30 and the roof bow assemblies 14.

The A-pillars 22 and the front structural support member 28 at least partially define an opening that is dimensioned to receive and support a windshield W. The A-pillars 22 are contoured elements that extend upward and rearward along the edge of the windshield W. Upper ends of the A-pillars 22 are shaped and dimensioned to attach to the side roof rails 26 and to the front structural support member 28. The B-pillars 24 are conventional elements whose upper ends attach to the side roof rails 26. The A-pillars 22 and the B-pillars 24 are also dimensioned and configured in a conventional manner to define conventional front door openings of the vehicle body structure 20.

Figure 3:
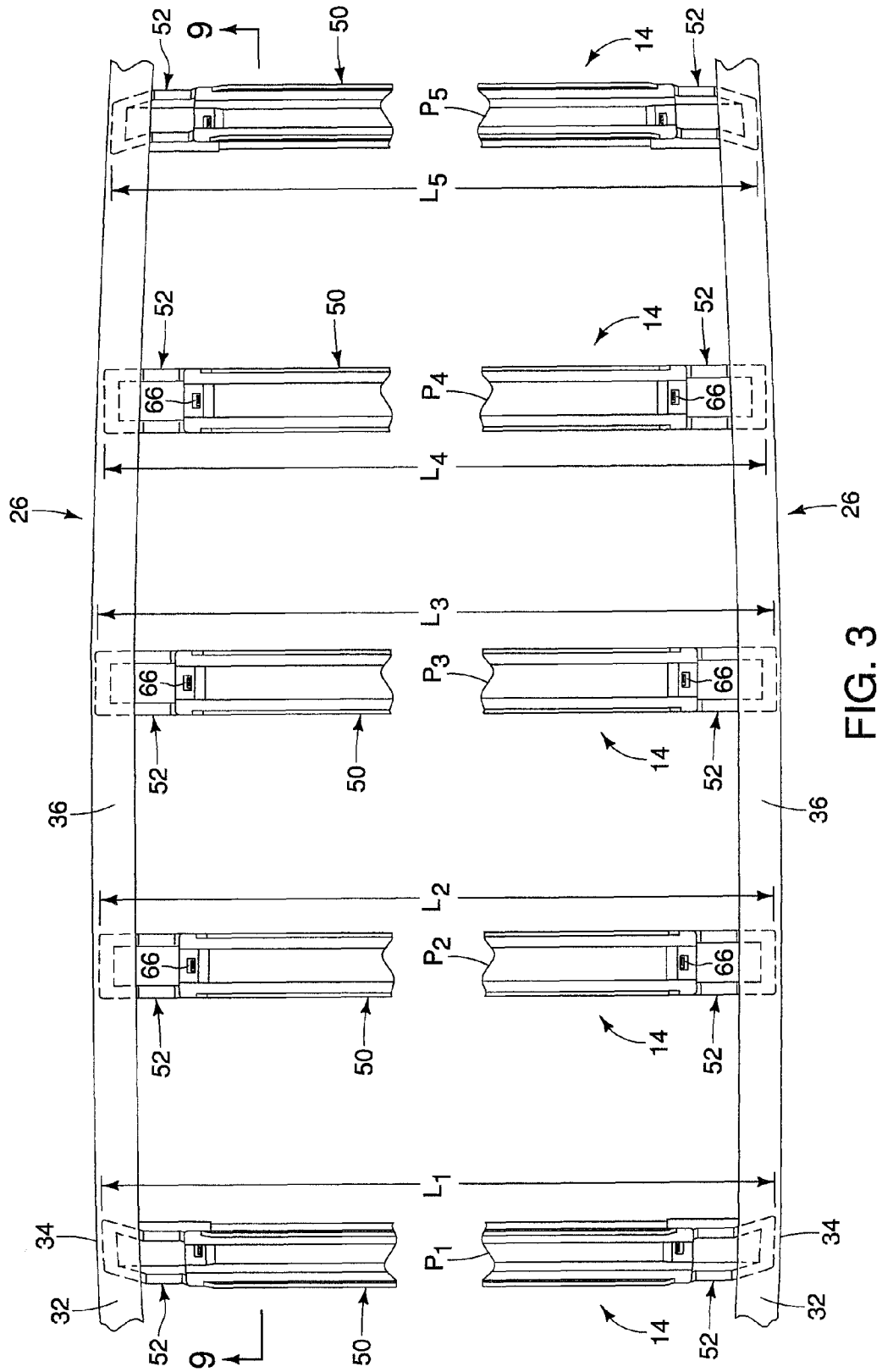
FIG. 3 is a top view of a vehicle body structure of the vehicle with the roof panel removed to reveal a plurality of the telescoping roof bow assemblies in accordance with the present invention.
Figure 4:
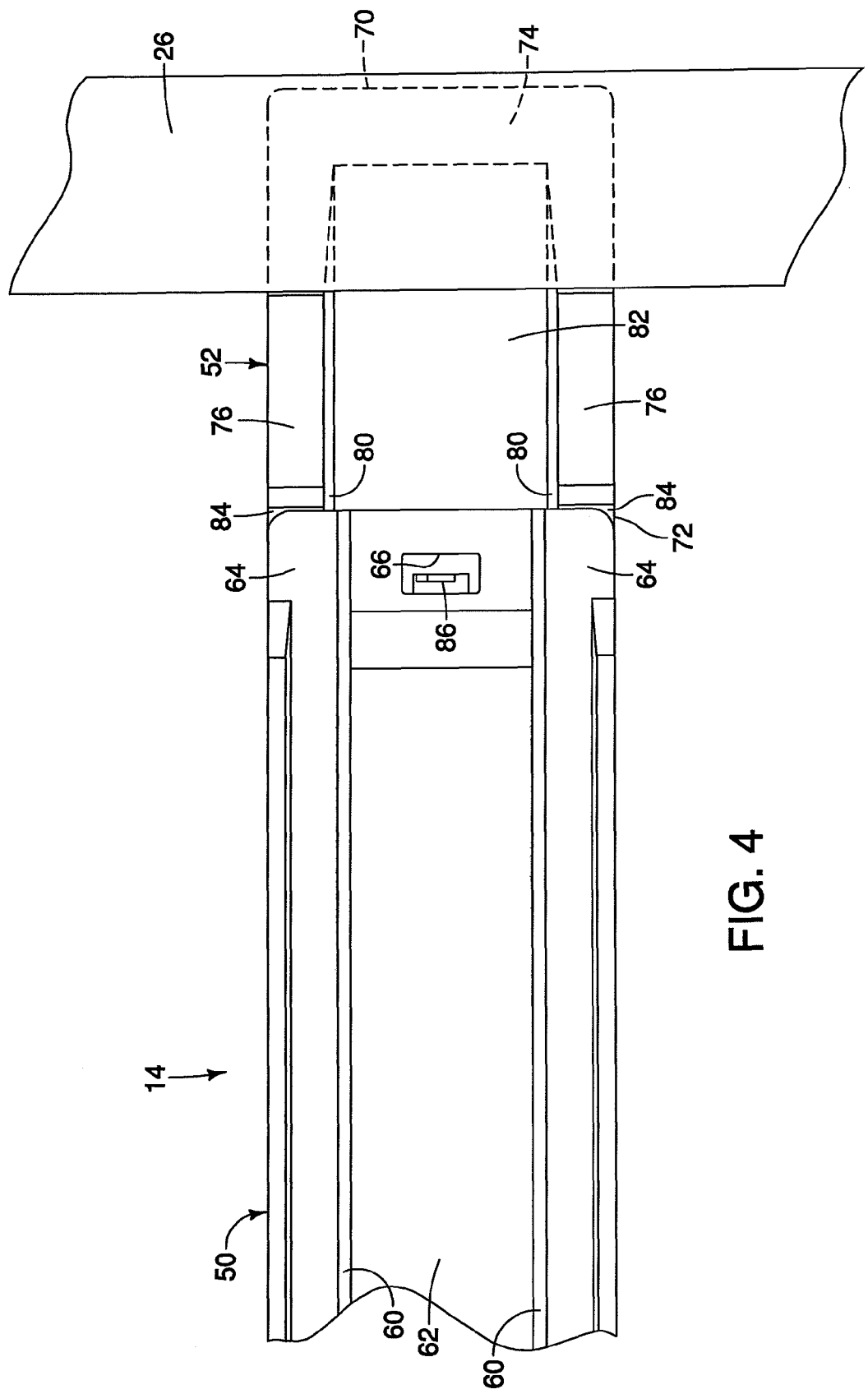
FIG. 4 is another top view of the vehicle body structure of the vehicle with the roof panel removed to show a roof bow member and a telescoping mounting bracket of one of the telescoping roof bow assemblies, with the telescoping mounting bracket fixed to a side roof rail of the vehicle body structure in accordance with the present invention.
Figure 9:
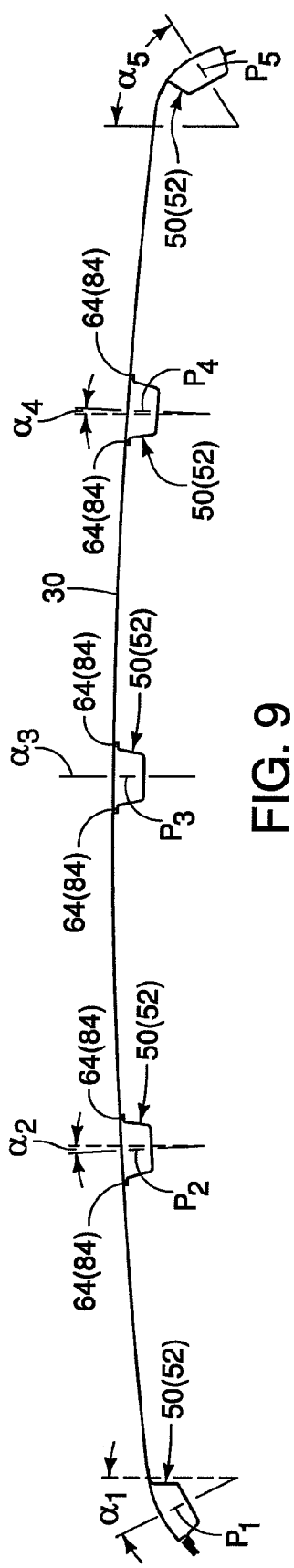
FIG. 9 is a schematic side cross-sectional view of the vehicle body structure schematically taken along the line 9-9 in FIG. 3, showing the roof panel and the plurality of telescoping roof bow assemblies in accordance with the present invention.

As shown in FIGS. 2 and 3, the side roof rails 26 are elongated members that include a forward sloped portion 32, a front curved portion 34 and a main rail portion 36. The forward sloped portions 32 extend upward from the A-pillars 22. The front curved portion 34 has a pronounced curved contour that makes an angled transition between the forward sloped portion 32 and the main rail portion 36. The main rail portion 36 has an overall horizontal configuration that extends from the front curved portion 34 rearward to the back end of the vehicle 12. However, the main rail portions 36 of the side roof rails 26 can further include a slight curvature relative to horizontal, as indicated in FIG. 9. Central regions of the main rail portions 36 of the side roof rails 26 can also be slightly bowed or curved outward from one another, as indicated in FIG. 3. Specifically, five positions $P_1$, $P_2$, $P_3$, $P_4$ and $P_5$ are indicated in FIG. 3. The position $P_1$ corresponds to a location extending between the front curved portions 34 of the two side roof rails 26. The position $P_5$ corresponds to a rear end of the vehicle 12. At each of the five positions $P_1$, $P_2$, $P_3$, $P_4$ and $P_5$ between the two the main rail portions 36 of the side roof rails 26 distances $L_1$, $L_2$, $L_3$, $L_4$ and $L_5$ are measured. The distances $L_1$, $L_2$, $L_3$, $L_4$ and $L_5$ are not necessarily equal to one another, as is described in greater detail below.

It should be understood from the drawings and the description herein that although five roof bow assemblies 14 are depicted, any number of roof bow assemblies 14 can be used in accordance with the present invention. For example, for a relatively small vehicle only two or three of the roof bow assemblies 14 may be required. For a longer vehicle, more than five of the roof bow assemblies 14 can be employed. In other words, the number of the roof bow assemblies 14 used in the vehicle depends upon the overall size of the vehicle and the structural requirements of the vehicle.

As indicated in FIG. 2, the front structural support member 28 extends between the A-pillars 22 and can include an extension member 40 that supports a portion of the roof panel 30 for providing rigidity. The roof bow assemblies 14 are installed to the vehicle body structure 20 rearward from the front structural support member 28 and the windshield W.

As indicated in FIGS. 1, 2 and 9, the roof panel 30 includes a front flange 42 (FIG. 2 only), a forward sloped roof portion 46 and an upper roof portion 48. The front flange 42 is dimensioned to extend laterally side to side between the A-pillars 22 and attach to the front structural support member 28. The forward sloped roof portion 46 extends upward from the front flange 42 a pre-determined distance above the upper ends of the A-pillars 24 and laterally side-to-side between the forward sloped portions 32 of the raised side roof rails 26. The upper roof portion 48 of the roof panel 30 is dimensioned to extend rearward from the forward sloped portion 32 to the end of the vehicle 12 and side-to-side between the main rail portions 36 of the side roof rails 26.

It should be understood from the drawings and the description that in an uninstalled state, the roof bow assemblies 14 are manufactured to be identical to one another. Therefore, a description of only one of the roof bow assemblies 14 is provided, with the description applying to all of the roof bow assemblies 14.

With specific reference to FIGS. 3-10, a description the roof bow assembly 14 is now provided. As shown in FIG. 3, the roof bow assembly 14 includes a roof bow member 50 and two telescoping mounting brackets 52. The telescoping mounting brackets 52 are disposed at respective opposite ends of the roof bow member 50. The roof bow assembly 14 is designed such that when installed on the side roof rails 26 of the vehicle body structure 20 of the vehicle 12, the roof bow member 50 extends in lateral side-to-side direction along an underside of the roof panel 30.

Figure 10:
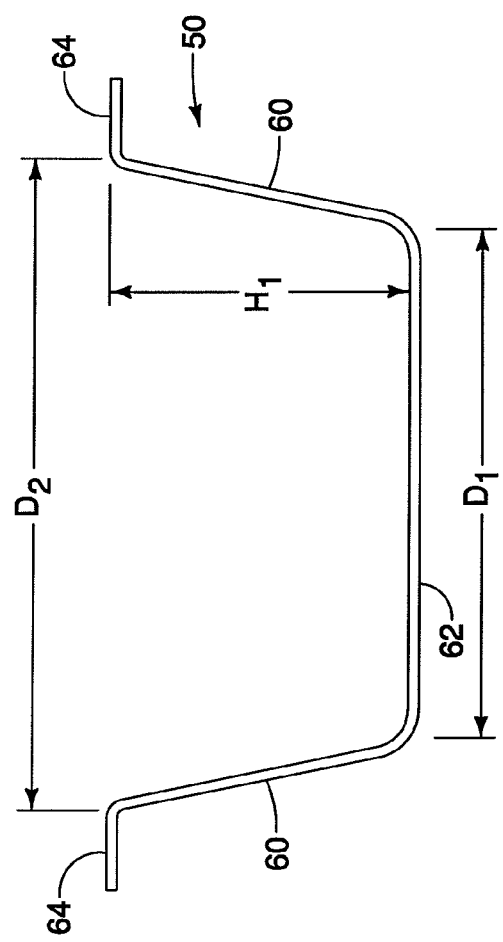
FIG. 10 is a cross-sectional view of one of the telescoping roof bow assemblies in accordance with the present invention.

As shown best in FIG. 10, the roof bow member 50 has a cross-sectional profile that includes two upright surfaces 60, a horizontal surface 62 and gussets 64. The two upright surfaces 60 extend in the lateral side-to-side direction with the horizontal surface 62 extending therebetween. The gussets 64 extend along side respective ones of the two upright surfaces 60 and are generally linearly co-planar with one another. The two upright surfaces 60 and the horizontal surface 62 define an open box shape in cross-section. Both ends of the horizontal surface 62 include an aperture 66 that extends through the roof bow member 50, as indicated in FIG. 3 and shown more clearly in FIGS. 5 and 6.

In FIG. 10, the two upright surfaces 60 are depicted as being angularly offset from one another. However, the two upright surfaces 60 can also be configured to be parallel to one another and the generally horizontal surface 62 can be perpendicular to both of the two upright surfaces 60. As shown in FIG. 10, the two upright surfaces 60 have a vertical height $H_1$ and the horizontal surface 62 has a width $D_1$ measured in a vehicle longitudinal direction that is equal to or greater than the vertical height $H_1$. Further, the gussets 64 are spaced apart from one another by a distance $D_2$ that is depicted as being greater than the width $D_1$. However, it should be understood from the drawings and the description herein that the width $D_1$ and the distance $D_2$ can be arranged to be equal to one another. In other words, the dimensions of the width $D_1$, the distance $D_2$ and the vertical height $H_1$ are not limited to the relative relationships depicted in FIG. 10, but can be varied depending upon the vehicle configuration that the roof bow assemblies 14 are used in. Further, the vertical height $H_1$ can be configured to be greater than either of the distance $D_2$ and the width $D_1$, if necessary and desired to fulfill a vehicle design requirements.

With reference now to FIGS. 4-8, a description of the telescoping mounting bracket 52 is now provided. The telescoping mounting bracket 52 is configured to telescopically move relative to the roof bow member 50 prior to rigid attachment to each other in order to provide adjustment to the overall length of the roof bow assembly 14. Since the telescoping mounting brackets 52 are all initially manufactured to the same specifications and tolerances, description of only one telescoping mounting bracket 52 is provided for the sake of brevity.

Figure 5:
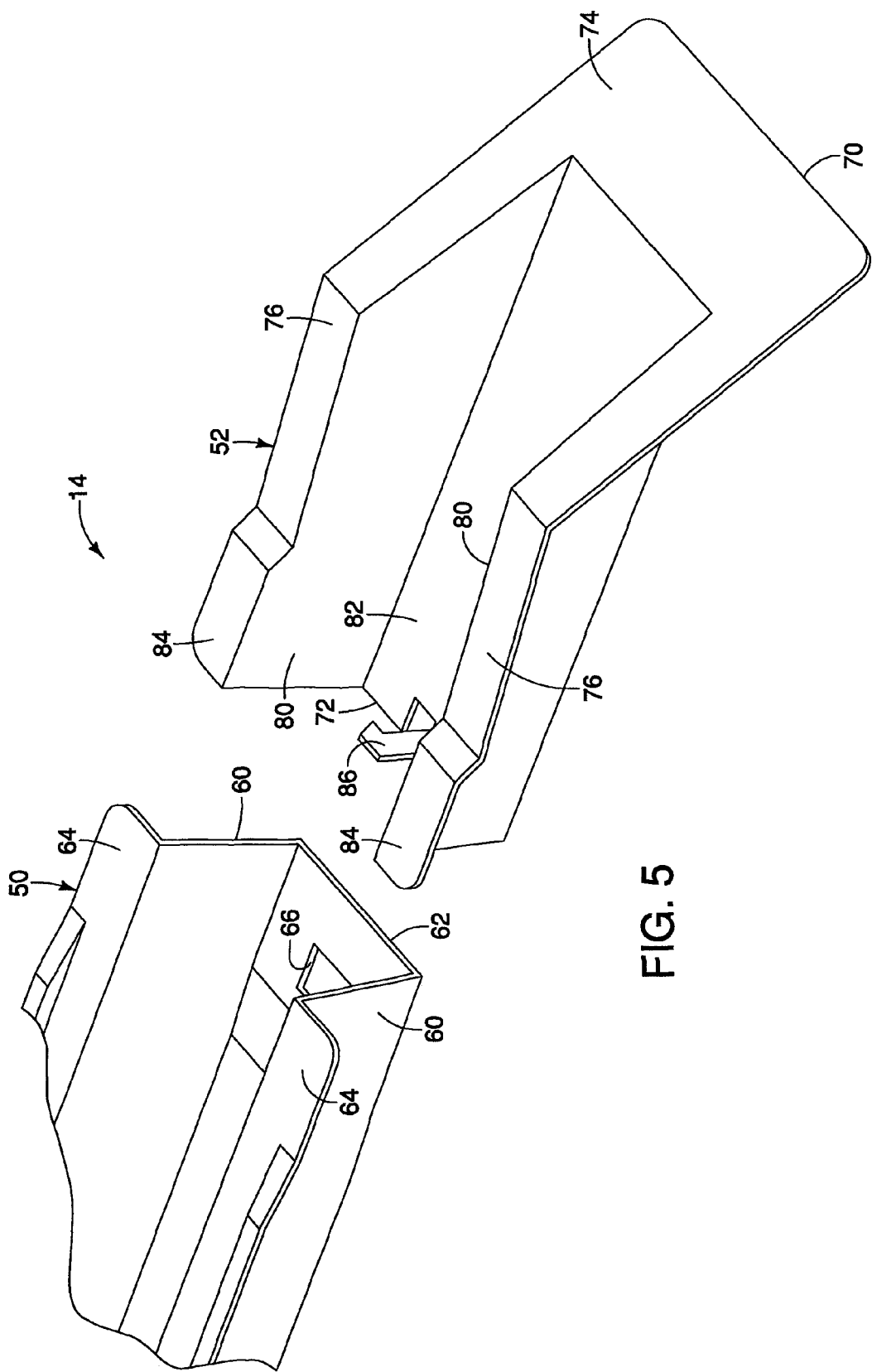
FIG. 5 is an exploded perspective view of showing one end of the roof bow member and the telescoping mounting bracket of the telescoping roof bow assembly in accordance with the present invention.

As best shown in FIG. 5, the telescoping mounting bracket 52 includes a first end 70 and a second end 72 with the first end 70 having a side rail attachment flange 74 configured for rigid attachment to one of the side roof rails 26 and a pair of roof panel attachment flanges 76 configured for rigid attachment to the roof panel 30.

The second end 72 is configured for attachment to the roof bow member 50. Specifically, the second end 72 includes two upright surfaces 80, a horizontal surface 82 with a hooking member 86 extending therefrom and gusset surfaces 84. The two upright surfaces 80 and the horizontal surface 82 are dimensioned to at least partially overlap with respective portions of the roof bow member 50 corresponding to the two upright surfaces 60 and the horizontal surface 62. More specifically, portions of the two upright surfaces 80 overlap with portions of the upright surfaces 60 of the roof bow member 50 and portions of the horizontal surface 82 overlap with the horizontal surface 62.

Figure 6:
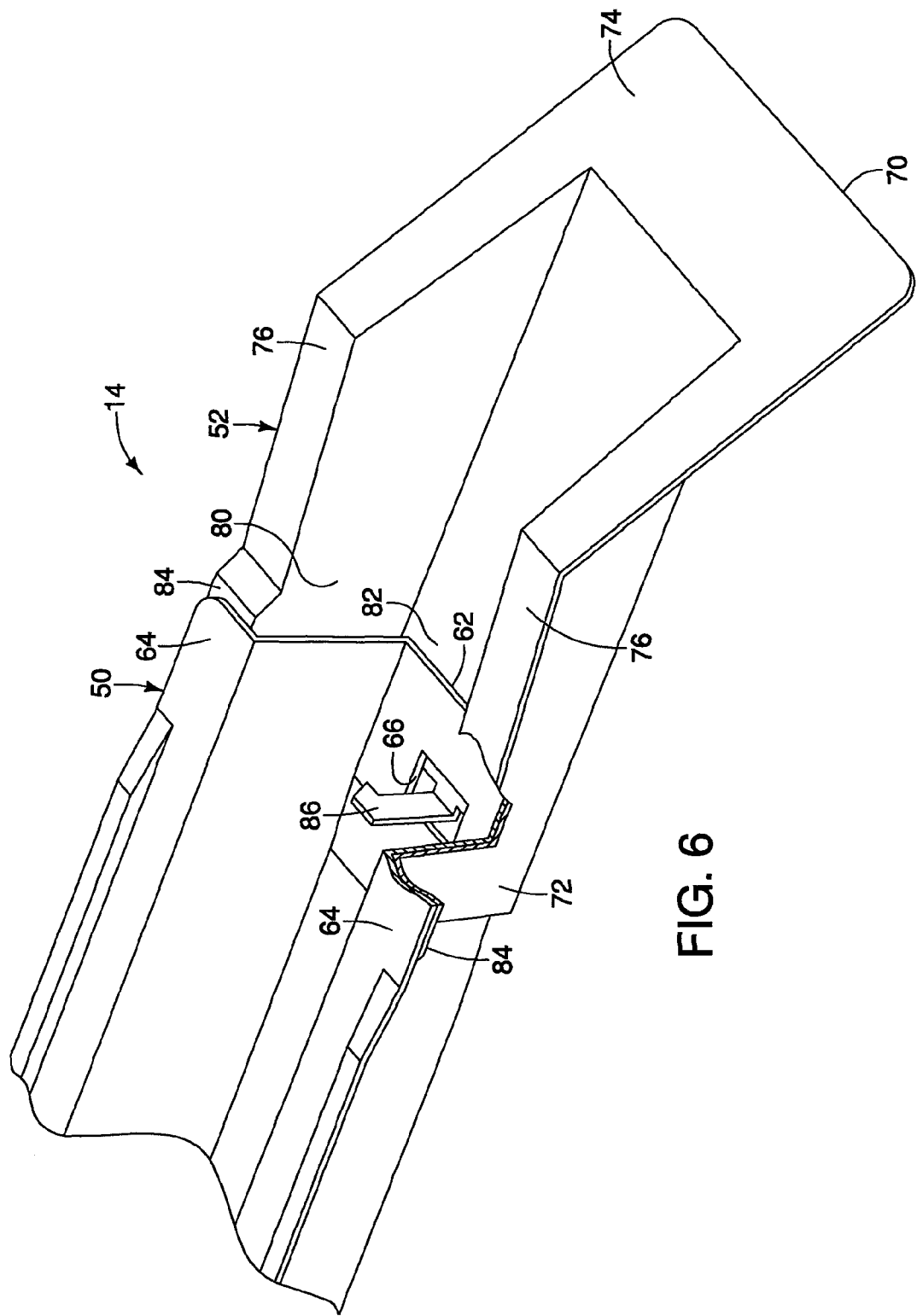
FIG. 6 is another perspective view of the telescoping roof bow assembly depicted in FIG. 5 showing the roof bow member and the telescoping mounting bracket connected one another in accordance with the present invention.

The side rail attachment flange 74 has an overall U-shape, as indicated in FIGS. 5 and 6. Sections of the side rail attachment flange 74 extend downward from the roof panel attachment flanges 76 and run along side the open box-like shape defined by the two upright surfaces 80 and the horizontal surface 82. Further, beneath the two upright surfaces 80 and the horizontal surface 82, a lower region of the side rail attachment flange 74 has a substantial surface area. Overall the surface area of the side rail attachment flange 74 is preferably greater than an area defined by the vertical height $H_1$ multiplied by either the distance $D_2$ or the width $D_1$, shown in FIG. 10. Thus, once the telescoping mounting bracket 52 is welded or otherwise rigidly fixed to one of the side roof rail 26, structural strength and rigidity is assured.

As shown in FIG. 6, the hooking member 86 is dimensioned to extend through the aperture 66. The length of the aperture 66 is significantly longer that the thickness of the hook member 84. Therefore, the hook member 84 and the entire telescoping mounting bracket 52 can slide along the overlapping portions of the roof bow member 50 providing a limited amount of telescoping movement. Only one end of the roof bow member 50 and one telescoping mounting bracket 52 is depicted in FIGS. 5 and 6. However, as shown in FIG. 3, the two telescoping mounting brackets 52 disposed at opposite ends of the roof bow member 50 are the same and include the hooking member 86. Further, the roof bow member 50 includes the apertures 66 at both ends thereof. Therefore, the overall length of each of the roof bow assemblies 14 can be varied by a predetermined amount, thus allowing for installation in each of the different positions $P_1$, $P_2$, $P_3$, $P_4$ and $P_5$ each having potentially different lengths or distances $L_1$, $L_2$, $L_3$, $L_4$ and $L_5$ between the side roof rails 26, as indicated in FIG. 3.

The roof bow assemblies 14 are installed to the vehicle body structure 20 in a manner described below. In accordance with a method for assembling the vehicle body structure 20, the following operations are performed. A plurality of the roof bow assemblies 14 are formed. The roof bow assemblies 14 are all formed in accordance with the same manufacturing specifications and tolerances. Consequently, each of the first roof bow assemblies includes a corresponding roof bow member 50 and a corresponding pair of the telescoping mounting brackets 52. It should be understood from the drawings and the description herein that one or both of the telescoping mounting brackets 52 can be hooked via the hooking member 86 to the roof bow members 50 prior to installation to the vehicle body structure 20. Alternatively, one or both of the telescoping mounting brackets 52 can be installed to the vehicle body structure 20 and thereafter the roof bow member 50 (and a second one of the telescoping mounting brackets 52) can be installed to the telescoping mounting bracket 52 already installed to the vehicle body structure 20. The above methods of assembly and other variations in order of assembly are with the scope of the present invention.

As mentioned above, the vehicle body structure 20 is assembled such that the pair of roof side rails 26 are attached to (among other elements) the A-pillars 22 and B-pillars 24. The roof side rails 26 include bow attachment points that correspond to the positions $P_1$, $P_2$, $P_3$, $P_4$ and $P_5$. In other words, at each of the positions $P_1$, $P_2$, $P_3$, $P_4$ and $P_5$ further designate bow attachment points on each of the roof side rails 26.

At the position $P_1$, one of the roof bow assemblies 14 is installed thereby extending between the bow attachment points of the roof side rails 26. As mentioned above, the roof bow assembly 14 can be positioned between the roof side rails 26 as an assembled unit or one or both of the telescoping mounting brackets 52 can be installed in place. Thereafter, the roof bow member 50 can be positioned to the telescoping mounting brackets 52.

Regardless of whether or not the roof bow assembly 14 is installed as a unit or in sections, the side rail attachment flange 74 of one of the two telescoping mounting brackets 52 is welded or otherwise rigidly fixed to the respective one of the side roof rails 26. Once at least one of the telescoping mounting brackets 52 has been welded or otherwise rigidly fixed to the side roof rail 26, the overall length of the roof bow assembly 14 can be adjusted. The interaction between the hooking member 86 and the aperture 66, and sliding relationship between the overlapping surfaces (upright surfaces 60 and 80 and horizontal surfaces 62 and 82) make overall length adjustment possible. Hence for position $P_1$, the roof bow assembly 14 is adjusted to the length or distance $L_1$.

With the overall length of the roof bow assembly 14 established for the position $P_1$, and length or distance $L_1$ between the side roof rails 26, the other of the two telescoping mounting brackets 52 is welded or otherwise fixed in place (unless it is already fixed in position), as indicated in FIG. 7. Thereafter, the roof bow member 50 is welded or otherwise fixed to the telescoping mounting brackets 52. More specifically, portions of the gusset surfaces 84 of the telescoping mounting brackets 52 are welded to corresponding portions of the gussets 64 of the roof bow member 50.

In the position $P_1$, the roof bow member 50 and the telescoping mounting brackets 52 overlapping one another by an overlap amount such that the roof bow assembly 14 can span the distance $L_1$ between the roof side rails 26. The above process is repeated for each of the positions $P_2$, $P_3$, $P_4$ and $P_5$. The overall length of the roof bow assembly 14 at position $P_1$ is equal to the distance $L_1$. The overall length of the roof bow assembly 14 at position $P_2$ is equal to the distance $L_2$. The overall length of the roof bow assembly 14 at position $P_3$ is equal to the distance $L_3$. The overall length of the roof bow assembly 14 at position $P_4$ is equal to the distance $L_4$. The overall length of the roof bow assembly 14 at position $P_5$ is equal to the distance $L_5$. It should be clear from FIG. 3 that the distances $L_1$, $L_2$, $L_3$, $L_4$ and $L_5$ are not necessarily equal to one another. It is possible for perhaps two or three of the distances $L_1$, $L_2$, $L_3$, $L_4$ and $L_5$ to be approximately equal to one another.

Consequently, at each of the positions $P_1$, $P_2$, $P_3$, $P_4$ and $P_5$, the roof bow member 50 and the telescoping mounting brackets 52 overlapping one another by an overlap amount that corresponds to the distance (distances $L_1$, $L_2$, $L_3$, $L_4$ and $L_5$) between the roof side rails 26 at the corresponding one of the positions $P_1$, $P_2$, $P_3$, $P_4$ and $P_5$. For example, FIG. 7 a minimum overlapping amount $A_3$ is shown corresponding to the position $P_3$. In FIG. 8 a maximum overlapping amount $A_1$ is shown corresponding to the position $P_1$. It should be understood from the drawings and the description herein that the overlapping amount varies at each of the positions $P_1$, $P_2$, $P_3$, $P_4$ and $P_5$ depending upon the corresponding distances $L_1$, $L_2$, $L_3$, $L_4$ and $L_5$.

Once the roof bow assemblies 14 are rigidly fixed in the desired positions, the roof panel 30 is installed. The roof panel 30 can be fixed in place by a combination of welding points and/or use of mastic to adhere the roof panel 30 in place. The roof bow member 50 of the roof bow assembly 14 is provided with the gussets 64 and the telescoping mounting brackets 52 are provided with the roof panel attachments flanges 76. The gussets 64 and the roof panel attachments flanges 76 are dimensioned and configured to attach to the roof panel 30, as shown in FIG. 9.

Although the telescoping mounting brackets 52 are provided with the roof panel attachments flanges 76, it should be understood from the drawings and the description herein that the roof panel attachments flanges 76 are optional locations for attachment to the roof panel 30. More specifically, the roof panel attachments flanges 76 are not always necessarily attached to the roof panel 30. For example, the optional use of the roof panel attachments flanges 76 depends upon the size, shape and contours of the roof panel 30. In some roof panel 30 designs, a gap may be required between the roof panel attachments flanges 76 and the roof panel 30. In other roof panel designs, the roof panel attachments flanges 76 can be welded or otherwise fixedly attached to contacting portions of the roof panel 30.

The side rail attachment flange 74 is shown in the drawings and described above as having an overall U-shape. However it should be understood from the drawings and the description herein that the side rail attachment flange 74 can have any of a variety of shapes and forms. For example, the side rail attachment flange 74 can be a series of smaller tabs or gussets extending outward from the first end 70 of the telescoping mounting bracket 52.

In the embodiment of the present invention depicted in FIG. 9, an additional feature of the roof bow assembly 14 is indicated. As mentioned above, the side roof rails 26 and the roof panel 30 can optionally include a slight curvature. Hence, the roof bow assembly 14 at the position $P_1$ is angularly offset from a vertical line by an angle $\alpha_1$. At the position $P_2$ the roof bow assembly 14 is angularly offset from a vertical line by an angle $\alpha_2$. At the position $P_3$ the roof bow assembly 14 is angularly offset from a vertical line by an angle $\alpha_3$. At the position $P_4$ the roof bow assembly 14 is angularly offset from a vertical line by an angle $\alpha_4$. At the position $P_5$ the roof bow assembly 14 is angularly offset from a vertical line by an angle $\alpha_5$. As indicated in FIG. 9, none of the angles $\alpha_1$, $\alpha_2$, $\alpha_3$, $\alpha_4$ or $\alpha_5$ is the same.

The various elements of the vehicle 12 and the vehicle body structure 20 not described above are conventional components that are well known in the art. Since these components are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
    a vehicle roof panel having an interior surface;
    a pair of roof side rails disposed on opposite sides of the vehicle roof panel;
    a first roof bow assembly extending laterally between the roof side rails at a first location beneath the vehicle roof panel, the first roof bow assembly having a first roof bow member and at least one first telescoping roof bow mounting bracket coupled to one end of the first roof bow member such that the first roof bow member and the first telescoping mounting bracket are positionable relative to one another at a first of a plurality of telescoping positions with the first roof bow member and the first telescoping roof bow mounting bracket overlapping by a first overlap amount corresponding to the first of the plurality of telescoping positions such that the first roof bow assembly spans a first distance between the roof side rails, the first roof bow member being fixedly attached to the interior surface of the vehicle roof panel, the first telescoping roof bow mounting bracket being fixedly attached to at least one of the vehicle roof panel and one of the pair of roof side rails, such that the first telescoping roof bow mounting bracket is not movable relative to the first roof bow member, the first telescoping roof bow mounting bracket including a side rail attachment flange that is connected to an inboard side surface of one of the pair of vehicle roof side rails, the first telescoping mounting bracket having a first end with the side rail attachment flange extending therefrom and a second end fixed to the roof bow member, the second end of the telescoping mounting bracket having a vertical height and a width when viewed in cross-section, the vertical height multiplied by the width defining an area of the second end, and the side rail attachment flange having a surface area that is greater than the area of the second end; and a second roof bow assembly configured to extending laterally between the roof side rails at a second location beneath the vehicle roof panel, the second roof bow assembly having a second roof bow member and at least one of a second telescoping roof bow mounting bracket coupled to one end of the second roof bow member such that the second roof bow member and the second telescoping mounting bracket are positionable relative to one another at a second of the plurality of telescoping positions with the second roof bow member and the second telescoping roof bow mounting bracket overlapping by a second overlap amount corresponding to the second of the plurality of telescoping positions, the second overlap amount being different from the first overlap amount such that the second roof bow assembly spans a second distance between the roof side rails, with the first and second distances being different lengths and the first roof bow member and the second roof bow member are formed with the same overall dimensions, the second roof bow member being fixedly attached to the interior surface of the vehicle roof panel, the second telescoping roof bow mounting bracket being fixedly attached to at least one of the vehicle roof panel and one of the pair of roof side rails, such that the second telescoping roof bow mounting bracket is not movable relative to the second roof bow member.

2. The vehicle body structure according to claim 1, wherein the first telescoping roof bow mounting bracket and the second telescoping roof bow mounting bracket are formed with the same overall dimensions.

3. The vehicle body structure according to claim 1, wherein each of the first telescoping roof bow mounting bracket and the second telescoping roof bow mounting bracket having a first end having a side rail attachment flange rigidly attached to one of the roof side rails and a roof panel attachment flange rigidly attached to the vehicle roof panel and a second end being attached to a respective one of the first and second roof bow members at respective ones of the first and second of the plurality of telescoping positions.

4. A vehicle body structure comprising:
a vehicle roof panel;
a pair of roof side rails disposed on opposite sides of the vehicle roof panel;
a first roof bow assembly extending laterally between the roof side rails at a first location beneath the vehicle roof panel, the first roof bow assembly having a first roof bow member and at least one first telescoping roof bow mounting bracket coupled to one end of the first roof bow member such that the first roof bow member and the first telescoping mounting bracket are positionable relative to one another at a first of a plurality of telescoping positions with the first roof bow member and the first telescoping roof bow mounting bracket overlapping by a first overlap amount corresponding to the first of the plurality of telescoping positions such that the first roof bow assembly spans a first distance between the roof side rails; and a second roof bow assembly configured to extending laterally between the roof side rails at a second location beneath the vehicle roof panel, the second roof bow assembly having a second roof bow member and at least one of a second telescoping roof bow mounting bracket coupled to one end of the second roof bow member such that the second roof bow member and the second telescoping mounting bracket are positionable relative to one another at a second of the plurality of telescoping positions with the second roof bow member and the second telescoping roof bow mounting bracket overlapping by a second overlap amount corresponding to the second of the plurality of telescoping positions, the second overlap amount being different from the first overlap amount such that the second roof bow assembly spans a second distance between the roof side rails, with the first and second distances being different lengths and the first roof bow member and the second roof bow member are formed with the same overall dimensions, and each of the first and second roof bow members has a cross-sectional profile that includes two upright surfaces that extend in the lateral side-to-side direction with a horizontal surface extending therebetween.

5. The vehicle body structure according to claim 4, wherein the two upright surfaces and the horizontal surface define an open box shape in cross-section.

6. The vehicle body structure according to claim 4, wherein the two upright surfaces are parallel to one another and the generally horizontal surface is perpendicular to the two upright surfaces.

7. The vehicle body structure according to claim 4, wherein the two upright surfaces have a vertical height and the horizontal surface has a width measured in a vehicle longitudinal direction that is equal to or greater than the vertical height.

8. The vehicle body structure according to claim 4, wherein the first telescoping roof bow mounting bracket and the second telescoping roof bow mounting bracket are formed with the same overall dimensions.

9. The vehicle body structure according to claim 4, wherein each of the first telescoping roof bow mounting bracket and the second telescoping roof bow mounting bracket having a first end having a side rail attachment flange configured for rigid attachment to one of the roof side rails and a roof panel attachment flange configured for rigid attachment to the vehicle roof panel and a second end being attached to a respective one of the first and second roof bow members at respective ones of the first and second of the plurality of telescoping positions.

10. The vehicle body structure according to claim 9, wherein
the second end of each of the first telescoping roof bow mounting bracket and the second telescoping roof bow mounting bracket extends in a horizontal direction when installed to the vehicle body structure and the first end of each of the telescoping roof bow mounting bracket and the second telescoping roof bow mounting bracket extend downward from the second end.

11. A vehicle body structure comprising:
a vehicle roof panel;
a pair of roof side rails disposed on opposite sides of the vehicle roof panel;

a first roof bow assembly extending laterally between the roof side rails at a first location beneath the vehicle roof panel, the first roof bow assembly having a first roof bow member and at least one first telescoping roof bow mounting bracket coupled to one end of the first roof bow member such that the first roof bow member and the first telescoping mounting bracket are positionable relative to one another at a first of a plurality of telescoping positions with the first roof bow member and the first telescoping roof bow mounting bracket overlapping by a first overlap amount corresponding to the first of the plurality of telescoping positions such that the first roof bow assembly spans a first distance between the roof side rails, the first roof bow member being attached to the vehicle roof panel; and a second roof bow assembly configured to extending laterally between the roof side rails at a second location beneath the vehicle roof panel, the second roof bow assembly having a second roof bow member and at least one of a second telescoping roof bow mounting bracket coupled to one end of the second roof bow member such that the second roof bow member and the second telescoping mounting bracket are positionable relative to one another at a second of the plurality of telescoping positions with the second roof bow member and the second telescoping roof bow mounting bracket overlapping by a second overlap amount corresponding to the second of the plurality of telescoping positions, the second overlap amount being different from the first overlap amount such that the second roof bow assembly spans a second distance between the roof side rails, with the first and second distances being different lengths and the first roof bow member and the second roof bow member are formed with the same overall dimensions, wherein the first telescoping roof bow mounting bracket has a first end, a second end and a lower surface extending between the first end and second end, and the first end of the telescoping roof bow mounting bracket includes a side rail attachment flange that extends downward below the lower surface, the side rail attachment flange being connected to one of the pair of vehicle roof side rails in an area below the lower surface of the telescoping roof bow mounting bracket.

12. The vehicle body structure according to claim 11, wherein
the side rail attachment flange of the first telescoping roof bow mounting bracket is directly attached to the one of the pair of vehicle roof side rails.

13. The vehicle body structure according to claim 1, wherein
the roof bow member includes at least one aperture adjacent to one end, and
the first telescoping mounting bracket includes a hooking member that extends from one end thereof, the hooking member extending through the aperture in the roof bow member, the hooking member and the aperture being dimensioned to limit an overall adjustable length of the first roof bow assembly.

14. The vehicle body structure according to claim 13, wherein
the hooking member is formed unitarily with first telescoping mounting bracket.

15. The vehicle body structure according to claim 13, wherein
the hooking member has a non-uniform cross-section along its length.

16. A vehicle body structure comprising:
a vehicle roof panel;
a pair of roof side rails disposed on opposite sides of the vehicle roof panel;
a first roof bow assembly extending laterally between the roof side rails at a first location beneath the vehicle roof panel, the first roof bow assembly having a first roof bow member and at least one first telescoping roof bow mounting bracket coupled to one end of the first roof bow member such that the first roof bow member and the first telescoping mounting bracket are positionable relative to one another at a first of a plurality of telescoping positions with the first roof bow member and the first telescoping roof bow mounting bracket overlapping by a first overlap amount corresponding to the first of the plurality of telescoping positions such that the first roof bow assembly spans a first distance between the roof side rails, the first roof bow member being attached to the vehicle roof panel; and
a second roof bow assembly configured to extending laterally between the roof side rails at a second location beneath the vehicle roof panel, the second roof bow assembly having a second roof bow member and at least one of a second telescoping roof bow mounting bracket coupled to one end of the second roof bow member such that the second roof bow member and the second telescoping mounting bracket are positionable relative to one another at a second of the plurality of telescoping positions with the second roof bow member and the second telescoping roof bow mounting bracket overlapping by a second overlap amount corresponding to the second of the plurality of telescoping positions, the second overlap amount being different from the first overlap amount such that the second roof bow assembly spans a second distance between the roof side rails, with the first and second distances being different lengths and the first roof bow member and the second roof bow member are formed with the same overall dimensions, wherein
the roof bow member includes at least one aperture adjacent to one end,
the first telescoping mounting bracket includes a hooking member that extends from one end thereof, the hooking member extending through the aperture in the roof bow member, the hooking member and the aperture being dimensioned to limit an overall adjustable length of the first roof bow assembly, and
the aperture is has an elongated shape that is dimensioned with an overall length that is greater that a corresponding length of the hooking member such that the first telescoping mounting bracket is movable relative to the roof bow member a distance approximately equal to the overall length of the aperture minus the corresponding length of the hooking member.

* * * * *